R. L. OWENS.
GRAIN SEPARATOR.
APPLICATION FILED APR. 25, 1916.
1,366,928.
Patented Feb. 1, 1921.
2 SHEETS—SHEET 1.
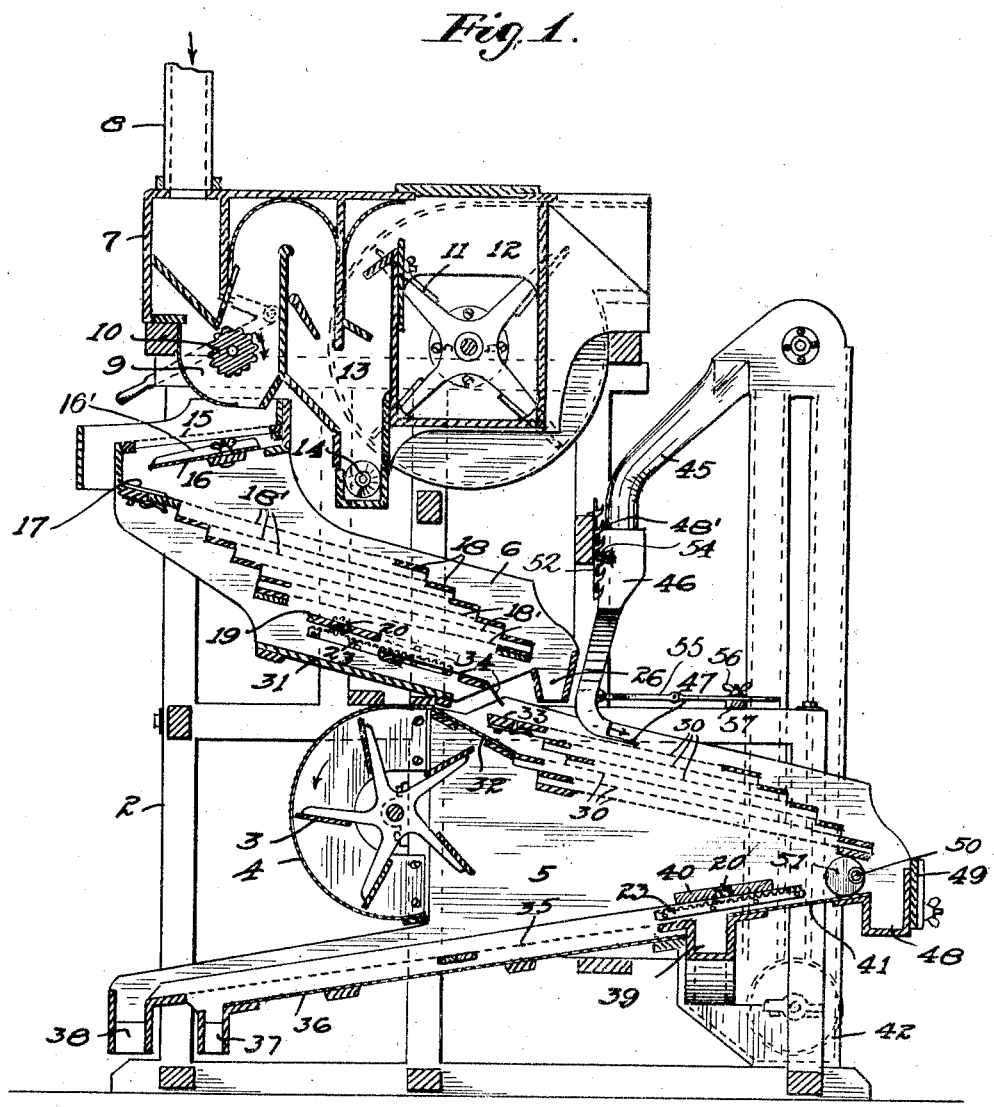

R. L. OWENS.
GRAIN SEPARATOR.
APPLICATION FILED APR. 25, 1916.

1,366,928.

Patented Feb. 1, 1921.
2 SHEETS—SHEET 2.

Witnesses
E. A. Paul
O. E. Sorensen

Inventor
RICHARD L. OWENS
By his Attorneys
Paul & Paul

UNITED STATES PATENT OFFICE.

RICHARD L. OWENS, OF MINNEAPOLIS, MINNESOTA.

GRAIN-SEPARATOR.

1,366,928.  Specification of Letters Patent.  Patented Feb. 1, 1921.

Application filed April 25, 1916. Serial No. 93,381.

*To all whom it may concern:*

Be it known that I, RICHARD L. OWENS, a citizen of the United States, resident of Minneapolis, in the county of Hennepin and State of Minnesota, have invented certain new and useful Improvements in Grain-Separators, of which the following is a specification.

This invention relates to improvements in grain separators, and the objects of the invention are to provide a machine of this character having a large capacity, and by which not only small seeds and all foreign material can be removed from the grain, but mixed grains may be separated, each kind being also thoroughly cleaned.

The invention consists generally in the constructions and combinations hereinafter described and particularly pointed out in the claims.

In the accompanying drawings forming part of this specification,

Figure 1 is a vertical section of a device embodying my invention,

Fig. 2 is a detail showing the means for adjusting one of the cut-off boards, these boards being generally designated as "repeat" boards.

Figure 4:
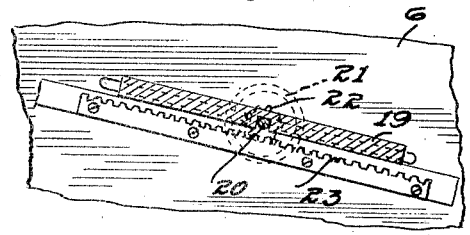
Fig. 4 is a section through one of the "repeat" boards.
Figure 3:
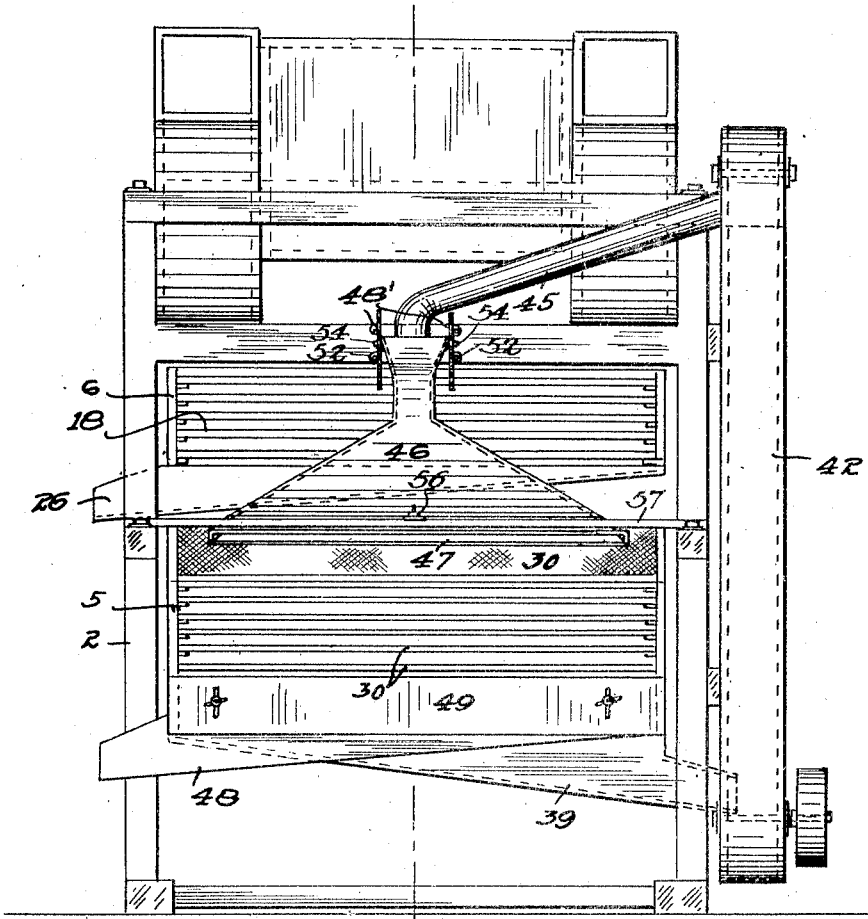
Fig. 3 is a rear end elevation of the machine.

In the drawings, 2 represents the frame of the machine, which may be of any suitable size and construction. It has arranged within it a suitable fan 3 located in a casing 4; and upper and lower inclined shoes 6 and 5, in which the various sieves or screens are mounted. The machine is provided at its upper end with a hopper 7 into which the grain is fed preferably through a suitable spout or conductor 8.

From the hopper 7 the grain passes into a feed chamber 9 provided with a roll 10. I prefer to provide a fan 11, mounted in a suitable fan-chamber or casing 12, which is connected to the upper part of the feed-chamber 9 through an aspirating chamber 13. The chamber 13 is preferably provided with a suitable feed screw 14 located at the bottom thereof for discharging material from said chamber. Suitable valves are arranged for controlling the strength of the air current through the feed and aspirating chamber. I have shown these parts in the drawing in order to properly illustrate the operation of my invention, but I make no claim in this application to the construction and arrangement of the feed chamber, the aspirating chamber or the fan coöperating therewith.

The shoes 5 and 6 are preferably supported upon suitable hangers so as to be capable of either a sidewise or an endwise shaking or oscillating movement, and means are preferably provided for producing a balanced lateral or longitudinal movement of both shoes. As this means may be of any suitable or preferred construction and is common in machines of this general type, I have not thought it necessary to illustrate such means in this application.

The upper end of the shoe 6 is preferably arranged directly below the outlet opening of the feed chamber 9. The shoe 6 is preferably provided with a suitable scalping sieve 15 which is designed to intercept and carry off the straw and other coarse material. Below the scalping sieve 15 is a deck or table 16, upon which the grain, passing through the scalping sieve 15, falls. This table preferably extends substantially parallel with the sieve 15, and is provided preferably with suitable spreaders 16' which distribute the grain across the table and cause it to fall in a thin sheet from the edge thereof. The grain falling from the table 16 is received upon a deck 17 at the head of the uppermost sieve of the gang carried by the upper shoe 6.

I have shown the upper shoe 6 provided with a series of sieve frames 18, each supporting a sieve 18'. These sieves are arranged to overlap each other and each is so located as to carry forward the grain received from the next sieve above in the gang.

In separating wheat from oats the oats will largely pass over the tail of the sieves 18' comprising the upper gang, and they are received in a spout 26 by which they are conducted laterally out of the machine.

I have here shown six sieves 18' constituting the gang in the upper shoe 6. I do not confine myself to this number, although I have found this a desirable arrangement. A greater or less number of sieves may, however, be employed in this gang.

At the bottom of the upper shoe 6 I prefer to arrange an inclined imperforate deck 31. This deck is preferably inclined in the same direction as the sieves 18' and any material received upon it is discharged upon a deck 32, carried by the lower shoe 5, and arranged to deliver the material that falls upon it to the second or intermediate gang of sieves as hereinafter described.

I arrange above the imperforate deck 31 a short imperforate deck 34 that is arranged to receive material falling through the lower part of the lowermost sieve 18'. The deck 34 also discharges its material onto the second or intermediate gang as hereinafter described. The imperforate deck 34 is preferably only about one-half as long as any one of the sieves 18' and as it is located below the lower or tail portion of the lowermost sieve 18' any material that fails through the upper portion of said lowermost sieve will, if not otherwise intercepted, fall directly upon the deck 31. I prefer to provide, however, a longitudinally adjustable imperforate "repeat" board or deck 19 that is arranged on a slightly higher level than the deck 34, and normally occupies the position shown by full lines in Fig. 1 of the drawings. A shaft 20 provided at one end with a hand wheel 21 is rotatably secured to the movable deck or repeat board 19, and it is provided with a pinion that engages a stationary rack bar 23. When the parts are in the position shown by full lines in Fig. 1 practically all of the grain that falls through the upper part of the lowermost sieve 18' will fall upon said repeat board, and, passing over said repeat board, will fall upon the deck 34 and will be conducted by it to the next gang of sieves as hereinbefore stated. With the parts in this position it will be noted that the material that passes over the tail of the sieves 18' will be received in the discharge spout 26, while the material that passes through all of the sieves 18' will fall upon the repeat board 19 and the deck 34 and will be conducted by said deck to the head deck 33 of the uppermost sieve 30 of the second or intermediate gang. With this arrangement, and with the parts in the position shown by full lines in the drawing, the oats, as before stated, will principally tail over the sieves of the upper gang and be discharged from the machine through the spout 26. The wheat and material passing through the sieves of the first or upper gang will fall upon the repeat board 19 and the imperforate deck 34 and be delivered to the head of the upper sieve of the second or intermediate gang.

It sometimes happens, however, that it is desirable to make a division of the grain passing through all of the sieves 18' of the first or upper gang. For this purpose the repeat board 19 is adjusted, so that it occupies preferably the position indicated by dotted lines in Fig. 1, and lies above the deck 34. It will be understood, however, that this repeat board may be adjusted to a greater or less extent, and may, therefore, only partially overlie the deck 34. To whatever degree it is adjusted, however, there will be some portion of the lowermost sieve of the first or upper gang that will discharge the material passing therethrough, which, as before stated, will usually be substantially clear wheat, directly onto the deck 31. This material will pass down over the decks 31 and 32 and will be delivered preferably to an intermediate sieve of the second or intermediate gang 30.

The sieves 30 of the second or intermediate gang (the upper gang of the lower shoe 5) are usually substantially the same as the sieves 18' of the first or upper gang.

I have here shown six sieves also employed in the second or intermediate gangs. I have also shown a head deck 33 arranged at the head of the uppermost sieve of this second gang and arranged to receive the material that tails over the deck 34. From the deck 33 all of the material passes to the head of the uppermost sieve 30 of the second gang. Head decks of usual form are arranged at the head of the second and third sieves of the second gang as shown in Fig. 1 of the drawings.

As here shown the material that reaches the deck 31 below the upper gang and passes over the deck 32 is received at the head of the fourth sieve 30 of the second gang.

All of the material that passes over the sieve 30 of the second gang is discharged from the machine through a suitable conductor 48.

The fan casing 4 in which is located the fan 3 is arranged upon the frame of the machine in position to deliver a current of air through the lower or second shoe 5, and through and along the under surfaces of the sieves 30 of the second gang hereinbefore described. This air current tends to float the material on the sieves 30 and assist it to travel toward the tail of this second gang. It will also tend to blow the lighter material passing over the tail of this gang over and beyond the conductor 48.

An adjustable wind board 49 is preferably provided for the purpose of regulating the amount of material blown over the conductor 48.

The shoe 5 is provided below the fan casing 4, with an imperforate deck 36, preferably inclined in the opposite direction to the sieves of the first and second gangs, and above the deck 36 I provide any suitable number of sieves 35 extending parallel with said deck and at a suitable distance above the same. Suitable conductors 37 and 38 are provided for receiving the material from the deck 36 and the sieves 35. At the upper end of the deck 36 I prefer to provide a transverse spout 39 arranged preferably to discharge into the boot of an elevator casing 42. A deck 41 is preferably arranged above the transverse spout 39 and flush with the upper edge thereof so that material falling upon the deck 41 will pass into the spout 39 and be directed into the elevator boot.

Above the spout 39 is an adjustable cut-off or repeat board 40. This board is preferably provided with a shaft 20 having a hand wheel 21 and with a pinion that engages a stationary rack bar 23. By this means the repeat board 40 may be adjusted so as to cover not only the spout 39 but a greater or less portion of the deck 41.

A suitable endless elevator of any ordinary construction is arranged in the elevator casing 42 and this elevator takes up the material discharged through the spout 39 and delivers it to a conductor 45 by which it is carried back to a point above the upper sieve 30 of the second gang. It is there delivered into a distributer 46 preferably of fan shape, and having its lower end open and turned backward and provided with a distributing plate 47. Arranged upon the frame of the machine at each side of the end of the conductor 45 is a bar 52 provided with a series of hooks 48'. The distributer 46 is provided with pins 54 that may be made to engage the hooks 48', and as the lower end of the conductor 45 extends into the upper end of the distributer 46 it will be noted that the operator may raise or lower the distributer 46 by changing the engagement of the pins 54 with the hooks 48'. By this means the distributer 46 may have its lower end brought nearer to or farther from the surface of the upper sieve 30. A rod 55 is preferably connected to the distributer 46 and this rod may be held in any desired position by a clamping nut 56, carried by a bar 57.

The means described permits the adjustment of the distributer 46, so as to bring its distributing plate 47 nearer to or farther from the head of the uppermost sieve of the second gang.

I prefer to provide means for vertically adjusting and thereby changing the pitch of the sieves of the second gang. As here shown I have provided a shaft 50 carrying one or more eccentrics 51 upon which the lower sieve frames of the second gang rest, as shown in Fig. 1 of the drawings. By adjusting this eccentric the pitch of the sieves of the second gang may be increased or diminished.

Operation.

When the machine is in operation it will be noted that the material that falls through the lowermost sieve of the second gang will strike upon the deck 41, the repeat board 40, or the sieve or sieves 35. The material that falls upon the deck 41 will pass directly through the spout 39 to the elevator. A considerable portion of the material that falls upon the repeat board 20 will, under the action of the air current, be blown off from the repeat board onto the deck 41. This material will also pass to the spout 39 and be discharged into the elevator. The remaining portion of the material will fall upon the repeat board 40 and traveling over the said board will fall upon the lower sieve or sieves 35 or it will fall directly upon said sieve from the sieves of the second or intermediate gang.

The mixed and uncleaned grain is discharged into the hopper 7 and passes therefrom onto the feed roll 10, moving over said feed roll, which is preferably rotatable, and falls into the bottom of the feed chamber 9. During this movement it is subjected to an upward air current produced by the fan 11 which carries the lighter material over into the aspirating chamber 13. The material that falls to the bottom of this chamber is taken out by the screw 14 and the lighter material is discharged from the machine by the fan.

The material falling from the feed chamber 9 is received by the scalping sieve 15, which takes out any straw or other coarse material. The grain passing through the sieve 15 falls upon the table 16 and is distributed the full width of the machine and discharged upon the head deck 17 of the first or upper gang. It passes from this deck onto the head of the uppermost sieve 18'. The greater part of the clear wheat will pass through the heads of the sieves in the upper gang and fall either upon the repeat board 19 or directly upon the deck 31 according to the location of said repeat board. The greater part of the oats will tail over from the sieves of the upper gang into the spout 26 from which they will be discharged from the machine. By adjusting the repeat board 19 the greater part of the clean wheat will fall upon the deck 31 and moving downward over said deck from the deck 32 will be received at the head of the fourth sieve of the second gang. The small quantity of oats that still accompanies the wheat will tend to travel over the sieves 30 while the wheat will tend to pass through at once and fall upon the lower part of the repeat board 40 or directly upon the sieve 35. The material reaching the head deck 33 will pass onto the head of the upper sieve where a further separation will take place, the oats tending to be carried over the upper sieves and the wheat passing through the same. Practically none of the wheat will tail over the second gang, but it will nearly all pass through said gang and the greater part of it will reach the sieves 35, either directly or from the repeat board 40. The material that reaches the deck 41 will be carried up in the manner already described and will be delivered through the conductor 45 and distributer 46 to the upper surface of the upper sieve 30. The point at which this material is delivered to the upper surface of this sieve may be predetermined as hereinbefore described. Any small seeds passing through the sieves with the wheat will be taken out by the lower sieves 35, and passing over the deck 36 will be discharged through the conductor 37.

The machine is particularly well adapted for separating "succotash" or mixed wheat and oats, and making a thorough cleaning both of the wheat and the oats.

I do not limit myself to the details of construction herein shown and described as the same may be varied in many particulars without departing from my invention.

I claim as my invention:

1. The combination, in a machine of the class described, with a vibrating shoe provided with a gang of sieves, and with an inclined deck arranged beneath said sieves, of a longitudinally movable repeat board or deck arranged between the lowermost sieve of said gang and said inclined deck and parallel substantially with said sieves and deck whereby the amount of material that reaches the inclined deck, after passing through the lowermost sieve, may be regulated, substantially as described.

2. The combination, in a machine of the class described, with a plurality of gangs of inclined sieves, of means for controlling the flow of material passing through the lower sieve of the upper gang, and directing the same to selective sieves of the next gang, substantially as described.

3. The combination, in a machine of the class described, with a pair of vibrating shoes each provided with a gang of sieves inclined in the same direction, of means for receiving and removing from the machine the material passing over the tail of the sieves of the upper gang, and means for dividing the material passing through the sieves of the upper gang and directing the same to selective sieves of the lower gang, substantially as described.

4. The combination, in a machine of the class described, with a pair of vibrating shoes both inclined in the same direction and each provided with a gang of sieves, of means for receiving and removing from the machine the material passing over the tail of the sieves of the upper gang, adjustable means for dividing into separate portions the material passing through said sieves, and means for directing said portions of said material to selective sieves of the lower gang, substantially as described.

5. The combination, in a machine of the class described, with a pair of vibrating shoes, both inclined in the same direction, and each provided with a gang of sieves also inclined in the same direction, of means for receiving and discharging from the machine the material tailing over the sieves of each gang, an adjustable plate inclined in the same direction as the sieves of both gangs for dividing into separate portions the material passing through the sieves of the upper gang, and means for directing said portions of said material to selective sieves of the lower gang, substantially as described.

6. The combination, in a machine of the class described, with a pair of vibrating shoes, both inclined in the same direction, and each provided with a gang of sieves also inclined in the same direction, of means for receiving and discharging from the machine the material tailing over the sieves of each gang, an adjustable plate inclined in the same direction as the sieves of both gangs for dividing into separate portions the material passing through the sieves of the upper gang, means for directing said portions of said material to selective sieves of the lower gang, and means for dividing into separate portions the material passing through the sieves of the lower gang and discharging said portions separately from said machine, substantially as described.

7. The combination, in a machine of the class described, with a pair of vibrating shoes, both inclined in the same direction, and each provided with a gang of sieves also inclined in the same direction, of means for receiving and discharging from the machine the material tailing over the sieves of each gang, adjustable means for dividing into separate portions of the material passing through the sieves of the upper gang, means for directing said portions of said material to selective sieves of the lower gang, means for dividing into separate portions the material passing through the sieves of the lower gang, and means for returning to the upper sieve of the lower gang a portion of the material passing through the sieves of said gang, substantially as described.

8. In a grain cleaning machine, the combination with a suitable grain feed mechanism, of a primary gang of sieves arranged beneath said feed mechanism, a secondary gang of sieves arranged beneath said primary gang, means for vibrating said primary and secondary gangs, means for directing the grain passed through the front portion of said primary gang onto the lower sieves of said secondary gang, and means for directing the grain passed through the rear portion of said primary gang onto the upper sieves of said secondary gang.

9. In a grain cleaning machine, the combination, with a primary feed spout, an upper sieve shoe, a lower sieve shoe, a discharge spout below said lower sieve shoe, a secondary feed spout or distributer delivering to said lower screen shoe, and means for elevating material from said discharge spout to said secondary feeder.

10. A grain separator comprising primary and secondary sieve frames superposed one above the other, means for oscillating said sieve frames, an adjustable dividing device carried by the secondary sieve frame for dividing the material coming through the primary sieve frame into two unseparated portions, and means for returning one of said unseparated portions directly to the first of the primary sieves for further treatment.

In witness whereof, I have hereunto set my hand this 10th day of April 1916.

RICHARD L. OWENS.